United States Patent
Wu et al.

(10) Patent No.: US 11,514,875 B1
(45) Date of Patent: Nov. 29, 2022

(54) METHOD FOR MITIGATING DIZZINESS, ELECTRONIC DEVICE, AND COMPUTER READABLE MEDIUM

(71) Applicant: HTC Corporation, Taoyuan (TW)

(72) Inventors: Jing-Lung Wu, Taoyuan (TW); Jin-Jia Lin, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 17/368,842

(22) Filed: Jul. 7, 2021

(51) Int. Cl.
| | |
|---|---|
| *G06F 3/01* | (2006.01) |
| *G02B 27/00* | (2006.01) |
| *G06V 40/10* | (2022.01) |
| *G09G 5/377* | (2006.01) |
| *G06T 19/00* | (2011.01) |
| *G06F 3/02* | (2006.01) |

(52) U.S. Cl.
CPC ............ *G09G 5/377* (2013.01); *G06F 3/012* (2013.01); *G06F 3/013* (2013.01); *G06F 3/02* (2013.01); *G06T 19/006* (2013.01); *G06T 2210/62* (2013.01); *G09G 2320/0606* (2013.01); *G09G 2340/10* (2013.01); *G09G 2340/14* (2013.01); *G09G 2354/00* (2013.01)

(58) Field of Classification Search
CPC . G06F 3/14; G06F 3/012; G06F 3/013; G06F 3/04847; G06F 3/02; G09G 5/377; G09G 5/391; G09G 2340/0407; G09G 2340/12; G09G 2380/12; G09G 2370/00; G09G 2320/0606; G09G 2340/10; G09G 2340/14; G09G 2354/00; G02B 27/0179; G02B 27/0172; G02B 2027/0147; G02B 2027/0138; G02B 2027/014; G02B 2027/0187; G06T 19/006; G06T 2210/62
See application file for complete search history.

(56) References Cited

U.S. PATENT DOCUMENTS

| | | | | |
|---|---|---|---|---|
| 2014/0361976 | A1* | 12/2014 | Osman | G02B 27/017 345/156 |
| 2017/0255258 | A1* | 9/2017 | Feiner | G02B 27/0172 |
| 2018/0101988 | A1* | 4/2018 | Murillo | G02B 27/0172 |
| 2018/0113317 | A1* | 4/2018 | DeBates | G02B 27/0172 |
| 2020/0018978 | A1* | 1/2020 | Vlachos | G06F 3/0312 |
| 2020/0042083 | A1* | 2/2020 | Min | G09G 5/37 |
| 2022/0084301 | A1* | 3/2022 | Joshi | G06T 15/20 |

FOREIGN PATENT DOCUMENTS

| | | |
|---|---|---|
| TW | I629507 | 7/2018 |
| TW | I653470 | 3/2019 |

OTHER PUBLICATIONS

"Office Action of Taiwan Counterpart Application", dated Jul. 14, 2022, p. 1-p. 5.

* cited by examiner

*Primary Examiner* — Bryan Earles
(74) *Attorney, Agent, or Firm* — JCIPRNET

(57) ABSTRACT

The embodiments of the disclosure provide a method for mitigating dizziness, an electronic device, and a computer readable medium. The method includes: providing a first visual content of a first reality mode in a field of view; and adding a specific mask to the first visual content, wherein the specific mask shows a specific part of a second visual content of a second reality mode, and a location of the specific mask in the first visual content is fixed.

19 Claims, 3 Drawing Sheets

METHOD FOR MITIGATING DIZZINESS, ELECTRONIC DEVICE, AND COMPUTER READABLE MEDIUM

BACKGROUND OF THE INVENTION

1. Field of the Invention

The present disclosure generally relates to a 3D display technology, in particular, to a method for mitigating dizziness, an electronic device, and a computer readable medium.

2. Description of Related Art

Motion sickness is a very common symptom for people, especially when traveling, taking boats, cars, motorcycles, airplanes, and other means of transportation. When the movement seen by the human eye does not match the movement felt by the vestibular system of the brain, symptoms such as fainting, nausea, and dizziness will appear.

In some cases, people wearing a head-mounted display (HMD) also suffers from motion sickness when experiencing virtual reality (VR) service, augmented reality (AR) service, mixed reality (MR) service, extended reality (XR), etc.

SUMMARY OF THE INVENTION

Accordingly, the present disclosure is directed to a method for mitigating dizziness, an electronic device, and a computer readable medium, which may be used to solve the technical problem.

The embodiments of the disclosure provide a method for mitigating dizziness, adapted to an electronic device. The method includes: providing a first visual content of a first reality mode in a field of view; and in response to determining that a mask function is activated, adding a specific mask to the first visual content, wherein the specific mask shows a specific part of a second visual content of a second reality mode, and a location of the specific mask in the first visual content is fixed.

The embodiments of the disclosure provide an electronic device including a storage circuit and a processor. The storage circuit stores a program code. The processor is coupled to the storage circuit, and accesses the program to perform: providing a first visual content of a first reality mode in a field of view; and in response to determining that a mask function is activated, adding a specific mask to the first visual content, wherein the specific mask shows a specific part of a second visual content of a second reality mode, and a location of the specific mask in the first visual content is fixed.

The embodiments of the disclosure provide a non-transitory computer readable medium, the computer readable medium recording an executable computer program, the executable computer program being loaded by an electronic device to perform steps of: providing a first visual content of a first reality mode in a field of view; and in response to determining that a mask function is activated, adding a specific mask to the first visual content, wherein the specific mask shows a specific part of a second visual content of a second reality mode, and a location of the specific mask in the first visual content is fixed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
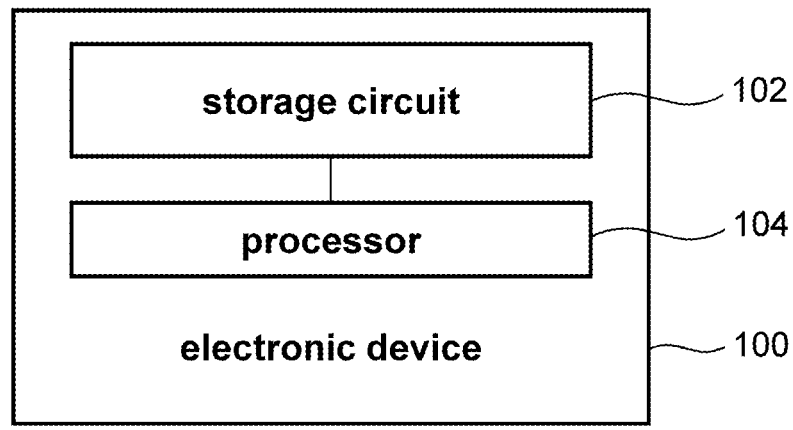
FIG. 1 shows a schematic diagram of an electronic device according to an exemplary embodiment of the disclosure.

Reference will now be made in detail to the present preferred embodiments of the invention, examples of which are illustrated in the accompanying drawings. Wherever possible, the same reference numbers are used in the drawings and the description to refer to the same or like parts.

See FIG. 1, which shows a schematic diagram of an electronic device according to an exemplary embodiment of the disclosure. In various embodiments, the electronic device 100 may be any devices that could provide visual contents (e.g., reality service contents such as VR/AR/MR/XR contents) to the user. In the embodiments of the disclosure, the electronic device 100 may be a host of a reality service system (e.g., VR/AR/MR/XR systems), wherein the reality service system may include other elements such as a head-mounted display (HMD), a controller, a position tracking element, but the disclosure is not limited thereto. In other embodiments, the electronic device 100 may also be a standalone reality service HMD, which may generate and display reality service contents to the user thereof, but the disclosure is not limited thereto.

For better understanding the concept of the disclosure, the electronic device 100 would be assumed to be a host that could provide visual contents for the corresponding HMD to display, but the disclosure is not limited thereto.

In FIG. 1, the electronic device 100 includes a storage circuit 102 and a processor 104. The storage circuit 102 is one or a combination of a stationary or mobile random access memory (RAM), read-only memory (ROM), flash memory, hard disk, or any other similar device, and which records a program code and/or a plurality of modules that can be executed by the processor 104.

The processor 104 may be coupled with the storage circuit 102, and the processor 104 may be, for example, a graphic processing unit (GPU), a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like.

In the embodiments of the disclosure, the processor 104 may access the modules and/or the program codes stored in the storage circuit 102 to implement the method for mitigating dizziness provided in the disclosure, which would be further discussed in the following.

Figure 2:
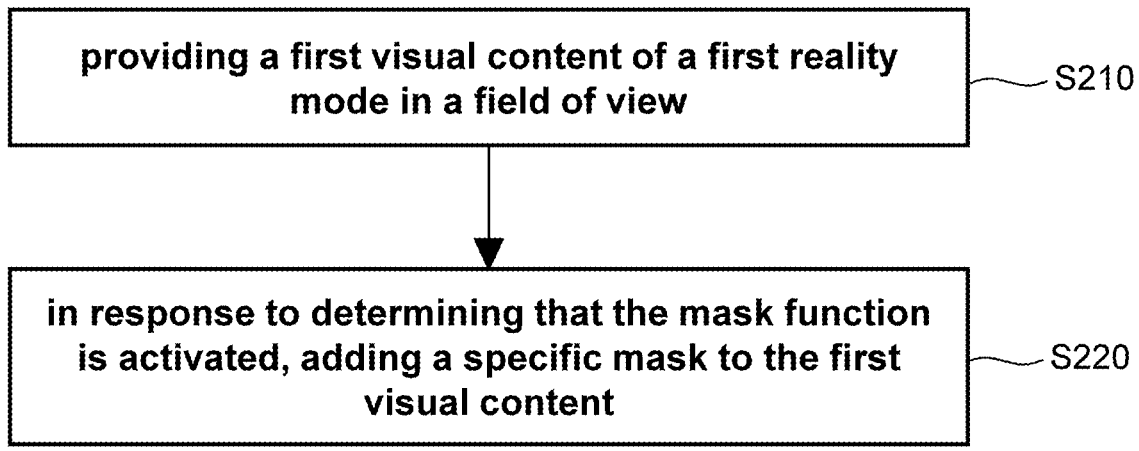
FIG. 2 shows a flow chart of the method for mitigating dizziness according to an embodiment of the disclosure.

See FIG. 2, which shows a flow chart of the method for mitigating dizziness according to an embodiment of the disclosure. The method of this embodiment may be executed by the electronic device 100 in FIG. 1, and the details of each step in FIG. 2 will be described below with the components shown in FIG. 1.

Firstly, in step S210, the processor 104 may provide a first visual content of a first reality mode in a field of view. For better understanding, FIG. 3 would be used as an example, but the disclosure is not limited thereto.

Figure 3:
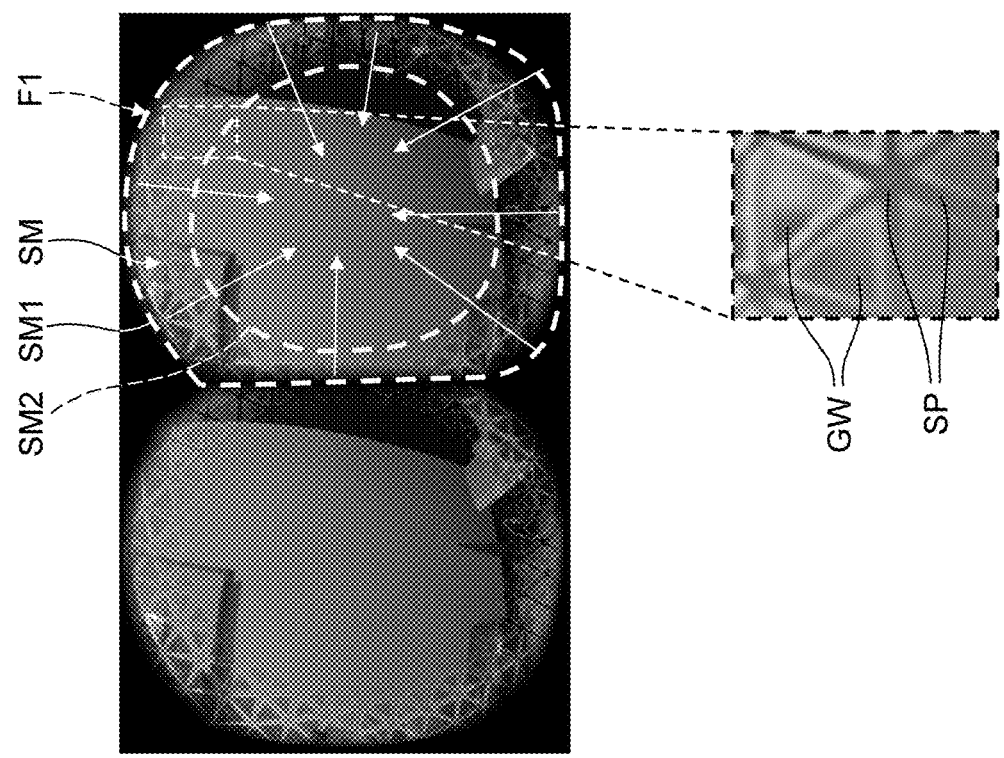
FIG. 3 shows a first visual content of a first reality mode according to an embodiment of the disclosure.
Figure 3:
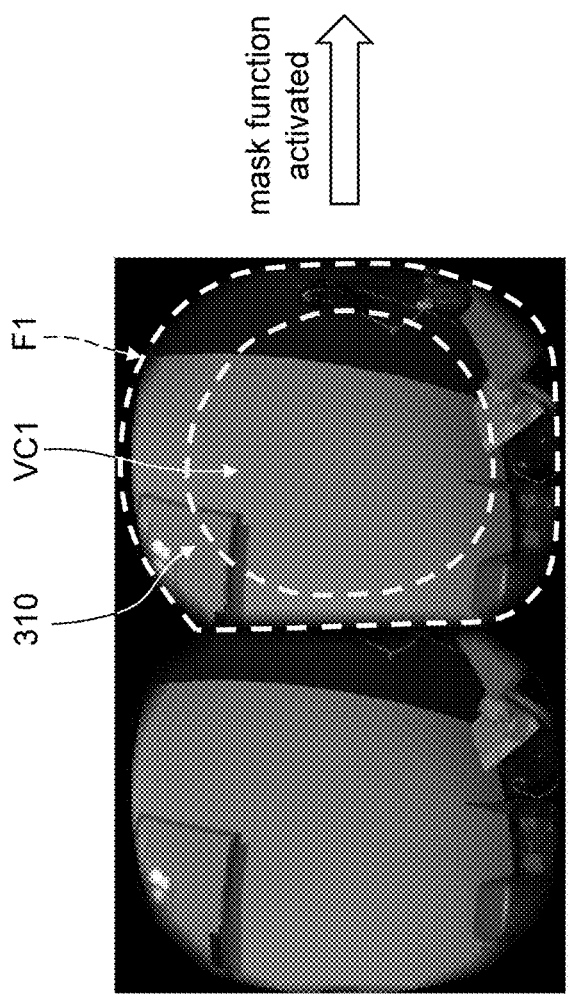

See FIG. 3, which shows a first visual content of a first reality mode according to an embodiment of the disclosure. In the embodiments of the disclosure, the processor 104 may perform the same operations to the visual contents of the field of views of the two eyes of the user, and hence only the operations performed to the visual contents of one eye (e.g., the right eye) would be discussed in the following, but the disclosure is not limited thereto.

In FIG. 3, the processor 104 may provide a first visual content VC1 of a first reality mode in a field of view (FOV) F1 of the HMD controlled by the electronic device 100. In the embodiment, the first reality mode may be an AR mode. In this case, the front cameras of the HMD may capture images of the scene in front of the HMD for the processor 104 to correspondingly generate the first visual content VC1. Afterwards, the processor 104 may provide the first visual content VC1 to the HMD for the HMD to display the first visual content VC1 to the user of the HMD, but the disclosure is not limited thereto.

When the user moves his/her head, the first visual content VC1 should be correspondingly adjusted in response thereto. However, as mentioned in the above, some user may feel dizzy during the movement. Therefore, in the embodiments of the disclosure, the processor 104 may add a specific mask SM to the first visual content VC1 for mitigating dizziness of the user.

Specifically, in the embodiments of the disclosure, the electronic device 100 may detect whether a mask function is automatically or manually activated. In step S220, in response to determining that the mask function is activated, the processor 104 may add the specific mask SM to the first visual content VC1.

In one embodiment, the HMD may be disposed with a button particularly for activating the mask function. In this case, in response to determining that this button has been triggered, the processor 104 may determine that the user of the electronic device 100 has manually activated the mask function. Accordingly, the processor 104 may add the specific mask SM to the first visual content VC1.

In another embodiment, the FOV F1 may be configured with a specific region 310, and the user may activate the mask function by putting the user gaze in the specific region 310 for more than a time threshold. In one embodiment, the specific region 310 may be designed to correspond to the region of the specific mask SM. In other embodiments, the specific region 310 may be adjusted to be any aspects/shapes/size/location based on the requirements of the designer. Therefore, in response to determining that the user gaze has stayed in the specific region 310 of the FOV F1 for more than the time threshold, the processor 104 may determine that the mask function is activated and add the specific mask SM to the first visual content VC1.

In yet another embodiment, the processor 104 may monitor the moving speed of the HMD and determine whether the moving speed is higher than a speed threshold. In response to determining that the moving speed of the HMD is higher than the speed threshold, it represents that the user may be more possible to feel dizzy, and hence the processor 104 may determining that the mask function is activated and add the specific mask SM to the first visual content VC1.

In one embodiment, in response to determining that the moving speed of the HMD is changed to be lower than the speed threshold by a time threshold, it represents that the user may be less possible to feel dizzy, and hence the processor 104 may determine that the mask function is deactivated and remove the specific mask SM from the first visual content VC1, but the disclosure is not limited thereto.

In the embodiments of the disclosure, the location of the specific mask SM in the first visual content VC1 is fixed, such that the user would feel less dizzy while watching the first visual content VC1. In FIG. 3, the specific mask SM may be a semi-transparent ring that surrounds at least a part of the FOV F1. In one embodiment, the specific mask SM may have an outer ring side SM1 and an inner ring side SM2, and a transparency degree of the specific mask SM may increase from the outer ring side SM1 to the inner ring side SM2 for not overly blocking the vision of the user.

In addition, in some embodiments, the processor 104 may allow the user to switch the electronic device 104 from providing contents of the first reality mode to providing contents of a second reality mode, wherein the second reality mode may be another reality mode different from the first reality mode. In this case, the processor 104 may run the service of the second reality mode (e.g., an VR mode) in the background for the user to use when needed.

In this case, the specific mask SM may show a specific part of a second visual content of the second reality mode. In FIG. 3, the specific mask SM may include a plurality of geometrical windows GW separated by a plurality of separating paths SP, wherein the geometrical windows GW may show the specific part of the second visual content of the second reality mode, and the separating paths SP may show corresponding parts of the first visual content VC1. That is, in FIG. 3, only the geometrical windows GW would be used to show the specific part of the second visual content, but the disclosure is not limited thereto. In other embodiments, the shapes/sizes of the geometrical windows GW and the separating paths SP may be adjusted based on the requirements of the designer, but the disclosure is not limited thereto.

In one embodiment, since the specific mask SM may show the specific part of the second visual content of the second reality mode, the processor 104 may adjust the specific part shown in the specific mask SM according to a movement of the HMD in response to detecting the movement of the HMD. That is, when the user moves his/her head, the specific part of the second visual content shown in the specific mask SM in the first visual content VC1 would be correspondingly adjusted in response thereto.

In one embodiment, the processor 104 may determine whether the electronic device 100 is switched from the first reality mode (e.g., the AR mode) to the second reality mode (e.g., the VR mode). In response to determining that the electronic device 100 is switched from the first reality mode to the second reality mode, the processor 104 may render the FOV F1 with the second visual content of the second reality mode from the outer side of the FOV F1 to the central region of the FOV F1. That is, the processor 104 may (gradually) render the FOV F1 with the second visual content along the arrows shown in FIG. 3, but the disclosure is not limited thereto.

In one embodiment, in response to determining that the electronic device 100 is switched from the first reality mode to the second reality mode, the processor 104 may render the FOV F1 outwardly from each of the geometrical windows GW with the second visual content of the second reality mode. Accordingly, the transition from the first reality mode to the second reality mode would be more smooth, which would further improve the user's visual experience.

In one embodiment, the processor 104 may determine whether a specific button on the HMD is triggered or a user gaze has stayed in a reference region of the FOV F1 for more than a time threshold. In one embodiment, the specific button on the HMD may be particularly designed for the user to switch reality modes, but the disclosure is not limited thereto. In another embodiment, the reference region of the FOV F1 may be designed for the user to switch reality modes by putting the user gaze in the reference region of the FOV F1 for more than the time threshold, but the disclosure is not limited thereto.

In one embodiment, in response to determining that the specific button on the HMD is triggered or the user gaze has stayed in the reference region of the FOV F1 for more than the time threshold, the processor 104 may determine that the electronic device 100 has been controlled to switch from the first reality mode to the second reality mode. Accordingly, the processor 104 may gradually render the FOV F1 with the second visual content from the outer side of the FOV F1 to the central region of the FOV F1.

Conventionally, when the user controls the HMD to switch from one reality mode to another reality mode, the HMD would directly and suddenly switch to show the whole visual content of the another reality mode, which may make the user feel an unsmooth transition between reality modes. By contrast, since the processor 104 may gradually render the FOV F1 with the second visual content from the outer side of the FOV F1 to the central region of the FOV F1, the user would feel a smoother transition between reality modes compared to the conventional way.

Figure 4:
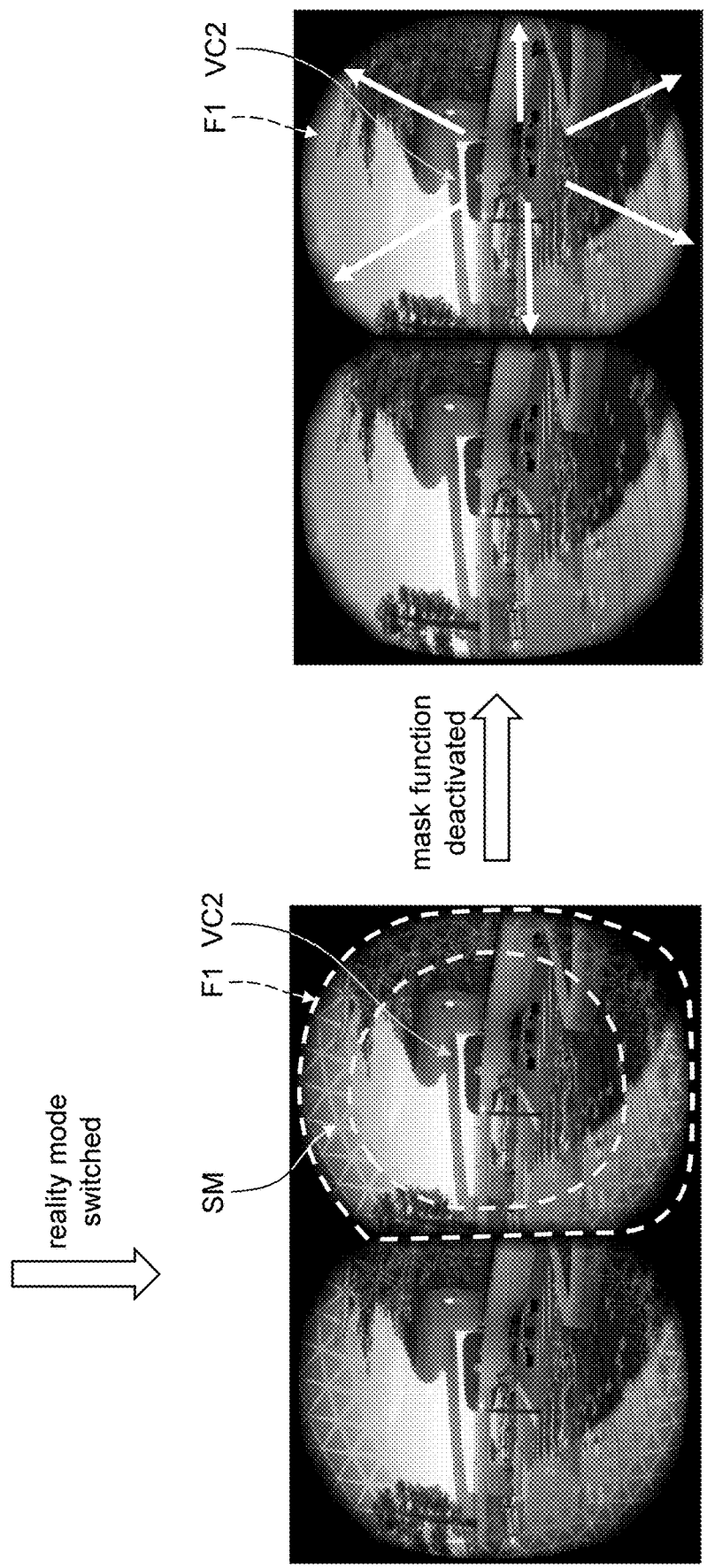
FIG. 4 shows the second visual content of the second reality mode according to an embodiment of the disclosure.

In the embodiments of the disclosure, the FOV F1 completely rendered with the second visual content of the second reality mode may be exemplarily shown in FIG. 4.

See FIG. 4, which shows the second visual content of the second reality mode according to an embodiment of the disclosure. In FIG. 4, the HMD may display the second visual content VC2 of the second reality mode in the FOV F1. As could be observed in FIG. 4, the processor 104 may maintain the specific mask SM in the second visual content VC2.

In one embodiment, a first visual range of the specific mask SM in the first visual content VC1 in FIG. 3 may correspond to a second visual range of the specific part in the second visual content VC2. Specifically, by cross-referencing FIG. 3 and FIG. 4, it could be observed that the contents shown in the specific mask SM in FIG. 3 correspond to the contents shown in the specific mask SM in FIG. 4. From another perspective, the processor 104 may be understood as extracting the specific part (which occupies the same visual range as the specific mask SM in the first visual content VC1) in the second visual content VC2 to fill in the specific mask SM added to the first visual content VC1 in FIG. 3, but the disclosure is not limited thereto.

In some embodiments, the processor 104 may determine whether the mask function is deactivated. In one embodiment, when the specific mask SM is shown in the FOV F1, the button originally used for activating the mask function may be used to deactivate the mask function. In this case, in response to determining that this button has been triggered, the processor 104 may determine that the user of the electronic device 100 has manually deactivated the mask function. Accordingly, the processor 104 may remove the specific mask SM from the second visual content VC2.

In other embodiments, the processor 104 may remove the specific mask SM in response to determining that the user gaze has stayed in some specific region of the FOV F1 for more than a time threshold or the moving speed of the HMD has been lower than the speed threshold for a while, but the disclosure is not limited thereto.

In some embodiments, the processor 104 may also allow the user to switch the HMD from the second reality mode back to the first reality mode via, for example, triggering the specific button on the HMD. When the processor 104 determines that the user wants to switch the HMD from the second reality mode back to the first reality mode, the processor 104 may (gradually) render the FOV F1 with the first visual content VC1 of the first reality mode from the central region of the FOV F1 to the outer side of the FOV F1. That is, the processor 104 may gradually render the FOV F1 with the first visual content VC1 along the arrows shown in FIG. 4, and the user may correspondingly see the first visual content VC1 shown on the left of FIG. 3, but the disclosure is not limited thereto.

In the above teachings, although the AR mode and the VR mode are respectively used as examples of the first reality mode and the second reality mode, the disclosure is not limited thereto. In other embodiments, the first reality mode and the second reality mode may be any two of a VR mode, an AR mode, an MR mode, an XR mode, a see-through mode, and the like.

In other embodiments, people with ordinary skills in the art should be able to understand the way of implementing the method of the disclosure by using a standalone reality service HMD based on the above teachings. In particular, the electronic device 100 may be implemented as the standalone reality service HMD that includes a display for showing the first visual content VC1 or the second visual content VC2 in the FOV F1. In this case, the operations performed by the processor 104 in the standalone reality service HMD for adjusting the contents shown in the FOV F1 may be referred to the teaching in the above, which would not be repeated herein.

The disclosure further provides a computer readable medium for executing the method for mitigating dizziness. The computer readable medium is composed of a plurality of program instructions (for example, a setting program instruction and a deployment program instruction) embodied therein. These program instructions can be loaded into the electronic device 100 and executed by the same to execute the method for mitigating dizziness and the functions of the electronic device 100 described above.

In summary, when the electronic device provides the first visual content of the first reality mode (e.g., the AR mode) to the user, the disclosure may further add the specific mask (which may be a semi-transparent ring) to the first visual content in response to determining that the mask function has been activated. Since the location of the specific mask in the first visual content is fixed, the user may feel less dizzy while watching the first visual content VC1 or the second visual content VC2, which may improve the user experience.

In addition, since the specific mask may be used to show the specific part of the second visual content of the second reality mode (e.g., the VR mode), the transition from the first reality mode to the second reality mode may be smoother, which also improves the user experience.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for mitigating dizziness, adapted to an electronic device, the method comprising:

providing a first visual content of a first reality mode in a field of view; and adding a specific mask to the first visual content, wherein the specific mask shows a specific part of a second visual content of a second reality mode, and a location of the specific mask in the first visual content is fixed, wherein the specific mask comprises a plurality of geometrical windows separated by a plurality of separating paths, wherein the geometrical windows show the specific part of the second visual content, and the separating paths show corresponding parts of the first visual content.

2. The method according to claim 1, wherein the specific mask is a semi-transparent ring that surrounds at least a part of the field of view.

3. The method according to claim 2, wherein a first visual range of the specific mask in the first visual content corresponds to a second visual range of the specific part in the second visual content.

4. The method according to claim 2, wherein the specific mask has an outer ring side and an inner ring side, and a transparency degree of the specific mask increase from the outer ring side to the inner ring side.

5. The method according to claim 1, wherein after the step of adding the specific mask in the first visual content, the method further comprises:

in response to detecting a movement of a head-mounted display for displaying the first visual content, adjusting the specific part shown in the specific mask according to the movement of the head-mounted display.

6. The method according to claim 1, wherein the field of view has a central region and an outer side, and after the step of adding the specific mask to the first visual content, the method further comprises:

in response to determining that the electronic device is switched from the first reality mode to the second reality mode, rendering the field of view with the second visual content of the second reality mode from the outer side to the central region.

7. The method according to claim 6, further comprising:

in response to determining that a specific button on a head-mounted display for displaying the first visual content is triggered or a user gaze has stayed in a reference region of the field of view for more than a first time threshold, determining that the electronic device is controlled to switch from the first reality mode to the second reality mode.

8. The method according to claim 6, further comprising:

in response to determining that the electronic device is switched from the second reality mode to the first reality mode, rendering the field of view with the first visual content of the first reality mode from the central region to the outer side.

9. The method according to claim 6, wherein the specific mask is maintained in the second visual content after the electronic device is switched to the second reality mode.

10. The method according to claim 1, further comprising:

in response to determining that a user of the electronic device manually activates a mask function, adding the specific mask to the first visual content;

in response to determining that a user gaze has stayed in a specific region of the field of view for more than a second time threshold, determining that the mask function is activated and adding the specific mask to the first visual content;

in response to determining that a moving speed of a head-mounted display for displaying the first visual content is higher than a speed threshold, determining that the mask function is activated and adding the specific mask to the first visual content; or in response to determining that the moving speed of the head-mounted display is changed to be lower than the speed threshold by a third time threshold, determining that the mask function is deactivated and removing the specific mask from the first visual content.

11. An electronic device, comprising:

a non-transitory storage circuit, storing a program code; and a processor, coupled to the display and the storage circuit, accessing the program to perform:

providing a first visual content of a first reality mode in a field of view; and adding a specific mask to the first visual content, wherein the specific mask shows a specific part of a second visual content of a second reality mode, and a location of the specific mask in the first visual content is fixed, wherein the specific mask comprises a plurality of geometrical windows separated by a plurality of separating paths, wherein the geometrical windows show the specific part of the second visual content, and the separating paths show corresponding parts of the first visual content.

12. The electronic device according to claim 11, wherein the electronic device is a host of a head-mounted display (HMD), and the processor performs:

providing the first visual content to the HMD for the HMD to display the first visual content.

13. The electronic device according to claim 11, wherein the electronic device is a head-mounted display and further comprises a display coupled to the processor, and the processor further controls the display to display the first visual content.

14. The electronic device according to claim 11, wherein the specific mask is a semi-transparent ring that surrounds at least a part of the field of view;

wherein a first visual range of the specific mask in the first visual content corresponds to a second visual range of the specific part in the second visual content;

wherein the specific mask has an outer ring side and an inner ring side, and a transparency degree of the specific mask increases from the outer ring side to the inner ring side.

15. The electronic device according to claim 11, wherein after adding the specific mask in the first visual content, the processor further performs:

in response to detecting a movement of a head-mounted display for displaying the first visual content, adjusting the specific part shown in the specific mask according to the movement of the head-mounted display.

16. The electronic device according to claim 11, wherein the field of view has a central region and an outer side, and after adding the specific mask to the first visual content, the processor further performs:

in response to determining that the electronic device is switched from the first reality mode to the second reality mode, rendering the field of view of the electronic device with the second visual content of the second reality mode from the outer side to the central region.

17. The electronic device according to claim 16, wherein the processor further performs:

in response to determining that a specific button on a head-mounted display for displaying the first visual content is triggered or a user gaze has stayed in a reference region of the field of view for more than a first time threshold, determining that the electronic device is controlled to switch from the first reality mode to the second reality mode;

in response to determining that the electronic device is switched from the second reality mode to the first reality mode, rendering the field of view with the first visual content of the first reality mode from the central region to the outer side;

wherein the specific mask is maintained in the second visual content after the electronic device is switched to the second reality mode.

18. The electronic device according to claim 11, wherein the processor further performs:

in response to determining that a user of the electronic device manually activates a mask function, adding the specific mask to the first visual content;

in response to determining that a user gaze has stayed in a specific region of the field of view for more than a second time threshold, determining that the mask function is activated and adding the specific mask to the first visual content;

in response to determining that a moving speed of a head-mounted display for displaying the first visual content is higher than a speed threshold, determining that the mask function is activated and adding the specific mask to the first visual content; or in response to determining that the moving speed of the head-mounted display is changed to be lower than the speed threshold by a third time threshold, determining that the mask function is deactivated and removing the specific mask from the first visual content.

19. A non-transitory computer readable medium, the computer readable medium recording an executable computer program, the executable computer program being loaded by an electronic device to perform steps of:

displaying a first visual content of a first reality mode in a field of view of the electronic device; and adding a specific mask to the first visual content, wherein the specific mask shows a specific part of a second visual content of a second reality mode, and a location of the specific mask in the first visual content is fixed, wherein the specific mask comprises a plurality of geometrical windows separated by a plurality of separating paths, wherein the geometrical windows show the specific part of the second visual content, and the separating paths show corresponding parts of the first visual content.

* * * * *